United States Patent
Kumagami

(10) Patent No.: US 8,400,329 B2
(45) Date of Patent: Mar. 19, 2013

(54) IMAGE DISPLAY APPARATUS FOR VEHICLE

(75) Inventor: Yusuke Kumagami, Fukushima-ken (JP)

(73) Assignee: Toshiba Alpine Automotive Technology Corporation, Iwaki-shi (JP)

( * ) Notice: Subject to any disclaimer, the term of this patent is extended or adjusted under 35 U.S.C. 154(b) by 448 days.

(21) Appl. No.: 12/779,359

(22) Filed: May 13, 2010

(65) Prior Publication Data

US 2011/0043341 A1   Feb. 24, 2011

(30) Foreign Application Priority Data

Aug. 18, 2009  (JP) ................................. 2009-189260

(51) Int. Cl.
*G08G 1/017* (2006.01)
(52) U.S. Cl. ........ 340/937; 345/626; 348/148; 348/149; 382/104; 382/105; 382/283
(58) Field of Classification Search .................. 340/937, 340/903, 435; 348/148, 149; 345/626, 629; 382/104, 105, 283
See application file for complete search history.

(56) References Cited

U.S. PATENT DOCUMENTS

| | | | |
|---|---|---|---|
| 6,498,620 B2* | 12/2002 | Schofield et al. | 348/148 |
| 7,652,559 B2* | 1/2010 | Chinomi et al. | 340/435 |
| 8,005,266 B2* | 8/2011 | Saka et al. | 382/104 |
| 2003/0108222 A1 | 6/2003 | Sato et al. | |
| 2005/0129272 A1* | 6/2005 | Rottman | 382/103 |
| 2006/0187238 A1 | 8/2006 | Yoneji | |
| 2009/0184845 A1* | 7/2009 | Saito | 340/937 |
| 2011/0211040 A1* | 9/2011 | Lindemann et al. | 348/36 |
| 2012/0121082 A1* | 5/2012 | Choi et al. | 380/28 |

FOREIGN PATENT DOCUMENTS

| | | |
|---|---|---|
| JP | 2006-25061 A | 1/2006 |
| JP | 2006-349456 | 12/2006 |
| JP | 2007-164275 | 6/2007 |
| JP | 2008-9761 | 1/2008 |
| JP | 4526868 B2 | 8/2010 |

OTHER PUBLICATIONS

Office Action issued Aug. 31, 2012, in Chinese Patent Application No. 201010225037.6.

\* cited by examiner

*Primary Examiner* — Brent Swarthout
(74) *Attorney, Agent, or Firm* — Oblon, Spivak, McClelland, Maier & Neustadt, L.L.P.

(57) ABSTRACT

According to one embodiment, an imaging unit inputs a camera image of surroundings of a vehicle. The surroundings include at least one of a front side and a back side of the vehicle. A first image generation unit generates a mask image to conceal a protection region of personal information included in a region of a first vehicle on the camera image. The first vehicle exists at the front side or the back side of the user's vehicle. A surroundings-monitoring unit decides whether a second vehicle exists at a front side or a back side of the first vehicle by monitoring the camera image. A second image generation unit generates an identification image of the second vehicle when the second vehicle exists. A processing unit generates a composite image by combining the mask image and the identification image with the camera image, and displays the composite image to present to a user of the vehicle.

5 Claims, 10 Drawing Sheets

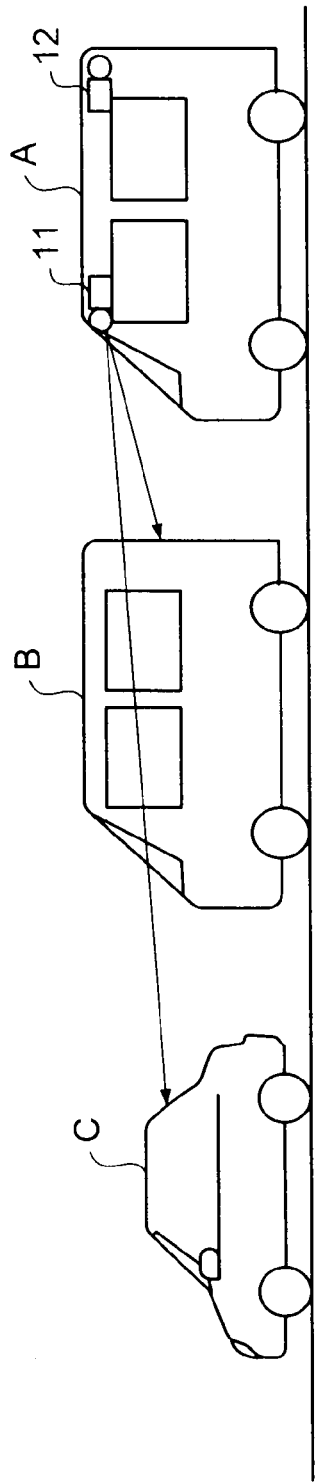
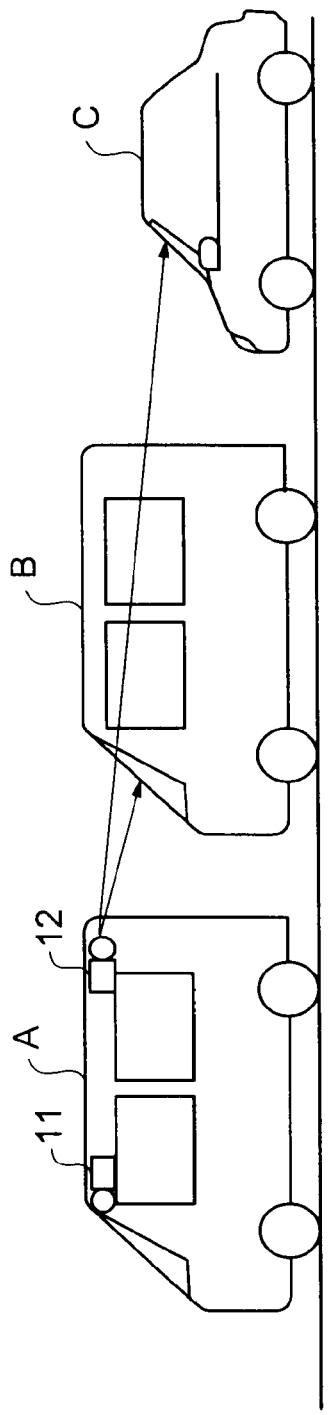
FIG. 2A
FIG. 2B

IMAGE DISPLAY APPARATUS FOR VEHICLE

CROSS-REFERENCE TO RELATED APPLICATION

This application is based upon and claims the benefit of priority from Japanese Patent Application No. 2009-189260, filed on Aug. 18, 2009; the entire contents of which are incorporated herein by reference.

FIELD

Embodiments described herein relate generally to an apparatus for displaying an image of surroundings of a vehicle by imaging at least one of a front side and a back side of the vehicle during running.

BACKGROUND

In conventional technique, an image display apparatus for a vehicle is well-known. As to this apparatus, a plurality of cameras is loaded onto a vehicle, and each camera images the front side or the back side of the vehicle along the moving direction. Briefly, by imaging a region hard for a driver to view during the vehicle's running, this image is displayed in order for the driver to visually recognize the region. Furthermore, while another vehicle is running at the back of the driver's vehicle along the same direction, irregular approach or behavior of another vehicle is monitored by imaging another vehicle. Alternatively, when the vehicle is driven backward to park, an image of the back side of the vehicle is displayed in order for the driver to supplement the driving.

On the other hand, recently, a camera-performance improves day by day, and a camera having a high resolution and an imaging at night is used. Accordingly, when the front side or the back side of a user's vehicle is imaged by a camera loaded onto the vehicle, for example, a person who rides in another vehicle running at the front or back of the vehicle along the same direction is often imaged. Furthermore, a document located in a cabin of another vehicle or a number-plate of another vehicle is often imaged.

However, an image by the camera often includes a region related to personal privacy such as a person's face or a number plate. Accordingly, when an image by a camera having high ability above human's eyesight is stored, the user may be accused by a crime such as an infringement of privacy or an imaging on condition that an object is unconscious of the imaging.

If the camera-performance further improves and an image having details and clearness can be seen, in near future, how to protect personal information in a cabin of another vehicle (moving at the front or back of the user's vehicle along the same direction) can be a problem. An object side cannot be aware whether the high performance-camera has a zoom function or a low light imaging function. Accordingly, the object side cannot decide whether an imaging by the camera is a behavior to supplement the driving or an imaging behavior on condition that the object is unconscious of the imaging. Furthermore, by improvement of the technique or rise of the needs, it is sufficiently expected that a camera loaded on to a vehicle (Hereinafter, it is called on-vehicle camera) has a higher fundamental performance and an imaging at night is often used.

Accordingly, when the on-vehicle camera to assist the driving is widely used, if the camera always monitors surroundings of the vehicle, a cabin of another vehicle can be continually watched from a user's vehicle while another vehicle is running at the side or back of the user's vehicle, and a person who rides in another vehicle has a bad feeling. Accordingly, as to on-vehicle equipment having the camera, in near future, means for protecting the personal information is necessary.

In JP-A 2008-9761 (Kokai), in order to protect the privacy, an apparatus for recording a cabin-environment is disclosed. As to this apparatus, information to personally specify a driver (For example, image including the driver's face) is masked. In JP-A 2007-164275 (Kokai), an image processing apparatus in a monitoring system is disclosed. As to this apparatus, a number plate part is identified in an image by the camera and concealed in the image. Furthermore, in JP-A 2006-349456 (Kokai), in order to understand a status of the dead angle occurred by another vehicle moving or turning to the right at the front of the user's vehicle, an example to monitor the status using a radar apparatus is disclosed.

However, by considering rise of the camera-performance, even if a face image of a driver or a number plate image is masked in an image of another vehicle, protection of personal information is difficult, and further improvement is desired. Furthermore, when a mask region of a vehicle moving at the front of the user's vehicle along the same direction (Hereinafter, the vehicle is called a first front vehicle) is enlarged, another vehicle moving at the front of the first front vehicle along the same direction (Hereinafter, another vehicle is called a second front vehicle) recognized via a window of the first front vehicle may be often concealed, and a function to assist the driving of the user's vehicle drops. In the same way, when a mask region of a vehicle moving at the back of the user's vehicle along the same direction (Hereinafter, the vehicle is called a first back vehicle) is enlarged, another vehicle moving at the back of the first back vehicle along the same direction (Hereinafter, another vehicle is called a second back vehicle) recognized via a window of the first back vehicle may be often concealed, and a function to assist the driving of the user's vehicle drops. Furthermore, usage of the radar apparatus requires high cost.

As mentioned-above, in a conventional image display apparatus for a vehicle, a part (For example, a face or a number plate) of the image by the camera is masked in order to protect the personal information. However, if the mask area is enlarged, the second front vehicle or the second back vehicle may be often concealed. As a result, a function to assist the driving of the user's vehicle drops.

BRIEF DESCRIPTION OF THE DRAWINGS

FIG. 2 is one example of a positional relationship among three vehicles to explain operation of one embodiment.

DETAILED DESCRIPTION

Figure 1:
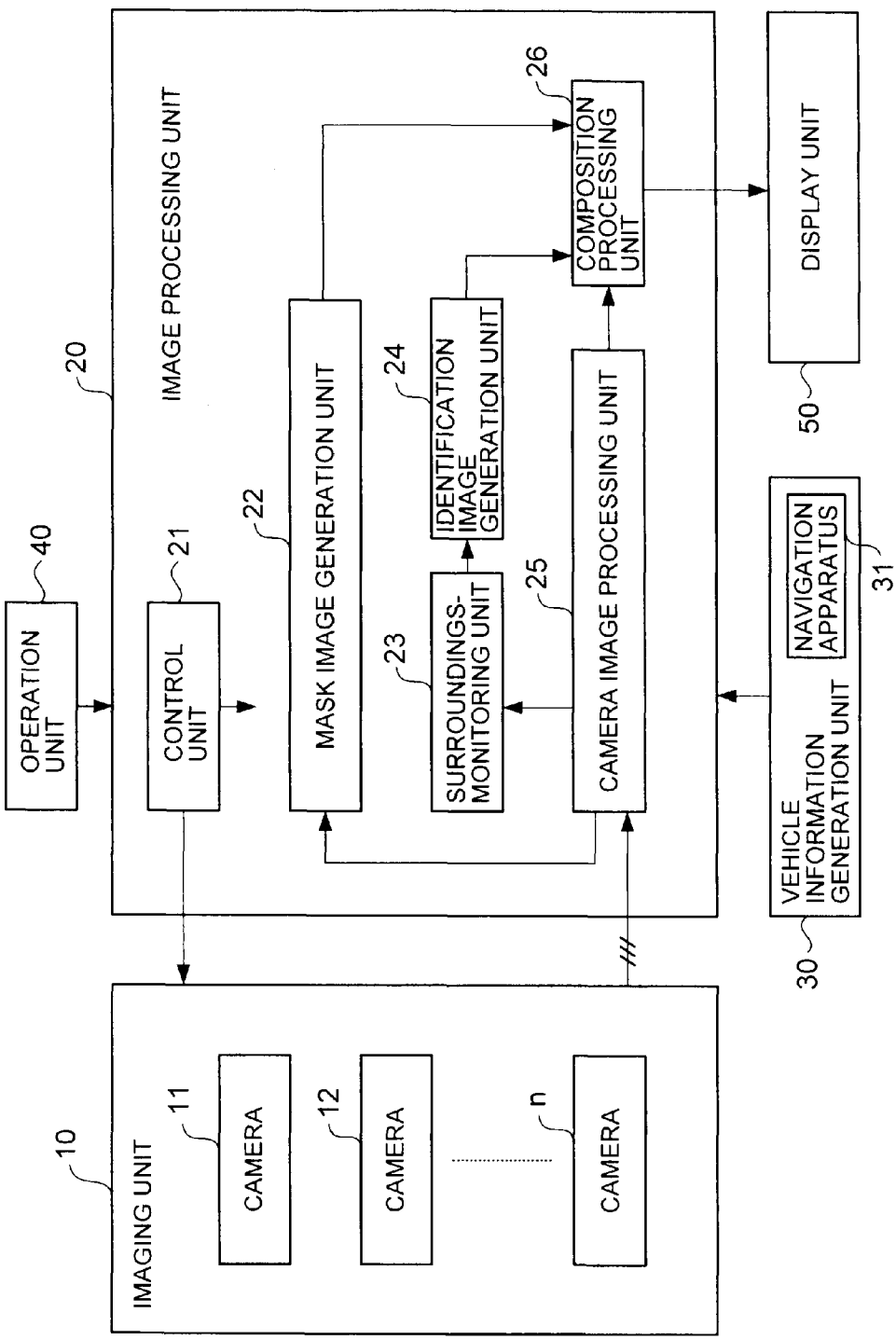
FIG. 1 is a block diagram of an image display apparatus for a vehicle according to one embodiment.

In general, according to one embodiment, an image display apparatus for a vehicle includes an imaging unit, a first image generation unit, a surroundings-monitoring unit, a second image generation unit, and a processing unit. An imaging unit is configured to input a camera image of surroundings of the vehicle. The surroundings include at least one of a front side and a back side of the vehicle along running direction. A first image generation unit is configured to generate a mask image to conceal a protection region of personal information included in a region of a first vehicle on the camera image. The first vehicle exists at the front side or the back side of the vehicle. A surroundings-monitoring unit is configured to decide whether a second vehicle exists at a front side or a back side of the first vehicle by monitoring the camera image. A second image generation unit is configured to generate an identification image of the second vehicle when the surroundings-monitoring unit decides that the second vehicle exists. A processing unit is configured to generate a composite image by combining the mask image and the identification image with the camera image, and to present the composite image to a user of the vehicle via a display.

Hereinafter, one embodiment of the present invention will be explained by referring to the drawings. The present invention is not limited to the following embodiment.

[Embodiment 1]

FIG. 1 is a block diagram of an image display apparatus for a vehicle according to one embodiment. In FIG. 1, the image display apparatus includes an imaging unit 10, an image processing unit 20, a vehicle information generation unit 30, an operation unit 40, and a display unit 50.

The imaging unit 10 includes a plurality of cameras 11, 12, . . . n to image surroundings of a user's vehicle. In this case, the user's vehicle means a particular vehicle to be mainly noticed. The camera 11, 12, . . . n respectively images the front side, the back side, the left side and the right side of the user's vehicle. Briefly, a video of surroundings of the user's vehicle, such as the first front vehicle, the first back vehicle, or a vehicle running on the opposite lane (Hereinafter, the vehicle is called an opposite vehicle), can be imaged. Each camera 11, 12, . . . n is equipped onto an arbitrary position of the user's vehicle. In following explanation, an example that a front camera 11 to image the front side of the user's vehicle and a back camera 12 to image the back side of the user's vehicle are equipped is explained.

The image processing unit 20 includes a control unit 21, a mask image generation unit 22, a surroundings-monitoring unit 23, an identification image generation unit 24, a camera image processing unit 25, and a composition processing unit 26. The control unit 21 includes a CPU, a ROM and a RAM, and controls operation of the image processing unit 20 and the imaging unit 10 in response to operation from the operation unit 40. The mask image generation unit 22 generates an image to mask a window of the first front vehicle, a window of the first back vehicle, and a number plate in an image from the cameras 11 and 12.

The surroundings-monitoring unit 23 monitors the second front vehicle and the second back vehicle which may be concealed by the first front vehicle and the second back vehicle respectively. Based on a monitoring result of the surroundings-monitoring unit 23, the identification image generation unit 24 generates an identification image representing existence of the second front vehicle and the second back vehicle, for example, an imitation image (illustration) of the second front image and the second back image. The camera image processing unit 25 processes images output from the cameras 11 and 12, selects an image (such as the first front vehicle and the first back vehicle) to be displayed on the display unit 50, and supplies the image to the composition processing unit 26. The composition processing unit 50 combines a camera image (output from the camera image processing unit 25) with a mask image (output from the mask image generation unit 22) and an identification image (output from the identification image generation unit 24), and outputs a composite image via the display unit 50.

The vehicle information generation unit 30 includes a navigation apparatus 31. The navigation apparatus 31 includes a GPS receiver to detect a present position of the user's vehicle, a recording medium to store map data, and a searching unit to search a path to the destination. Furthermore, the navigation apparatus 31 includes a velocity sensor or a gyro sensor to detect a velocity, an acceleration or a slant of the user's vehicle, which are connected to a cabin-LAN such as CAN (Controller Area Network). Accordingly, information such as the present position and a driving direction (advance, back, turn to the right or left) of the user's vehicle is acquired from the vehicle information generation unit 30.

The operation unit 40 is operated by a user (such as a driver), and executes switching operation of screen in case of displaying the image (output from the cameras 11 and 12). The display unit 50 includes a display panel such as a liquid crystal display. By setting the display unit 50 as a touch panel system, the display unit 50 is used as the operation unit 40, and the present place and the destination can be input in case of displaying a navigation image.

Hereinafter, operation of the one embodiment is explained. FIG. 2A shows one example that the front camera 11 loaded onto the user's vehicle A images the first front vehicle B and the second front vehicle C. FIG. 2B shows one example that the back camera 12 loaded onto the user's vehicle A images the first back vehicle B and the second back vehicle C. Moreover, the first front vehicle B and the first back vehicle B are generically called a first vehicle B, and the second front vehicle C and the second back vehicle C are generically called a second vehicle C.

In the present embodiment, when an image of the first vehicle B is included in a background image from the front camera 11 or the back camera 12, in order not to display an image of personal information, for example, a region such as a window, a number plate and a cabin of the vehicle, is automatically recognized. Then, in order to conceal the region as a protection region of personal information, a mask image is generated in real time and displayed by overlapping with the camera image. As the mask image, for example, the region may be painted, or a mosaic image may be used.

Figure 3:
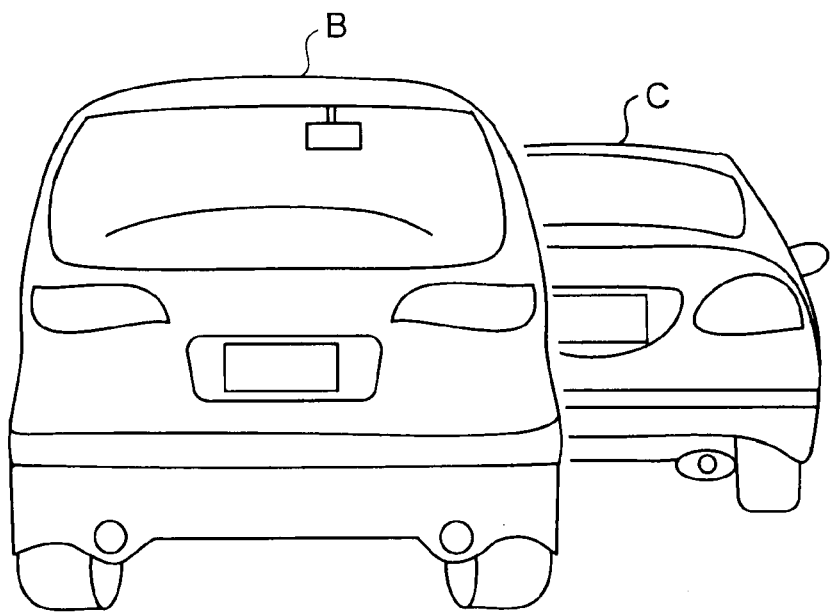
FIG. 3 is one example of an image at the front side of a user's vehicle along the vehicle's running direction.

FIG. 3 shows one example of an image of the front side of the user's vehicle. In FIG. 3, the first front vehicle B and the second front vehicle C exist at the front of the user's vehicle, and a real time image in which the second front vehicle C is smaller than the first front vehicle B is shown. On the other hand, in order to mask the image including personal information, as shown in FIG. 4, a window part and a number plate part of the first front vehicle B are masked by mask images D1 and D2 respectively.

The mask images D1 and D2 are generated by the mask image generation unit 22. In general, a window is located at the upper side of the vehicle, and a color of the window is different from a body color of the vehicle. Accordingly, by deciding the window based on an approximate position and color information, a mask image D1 is generated. Furthermore, in general, a number plate is located at the lower part of the vehicle, and a shape of the number plate is a rectangle. Accordingly, by deciding the number plate based on an approximate position and a shape, a mask image D2 is generated. The mask images D1 and D2 are combined with a camera image by the composition processing unit 26.

Figure 4:
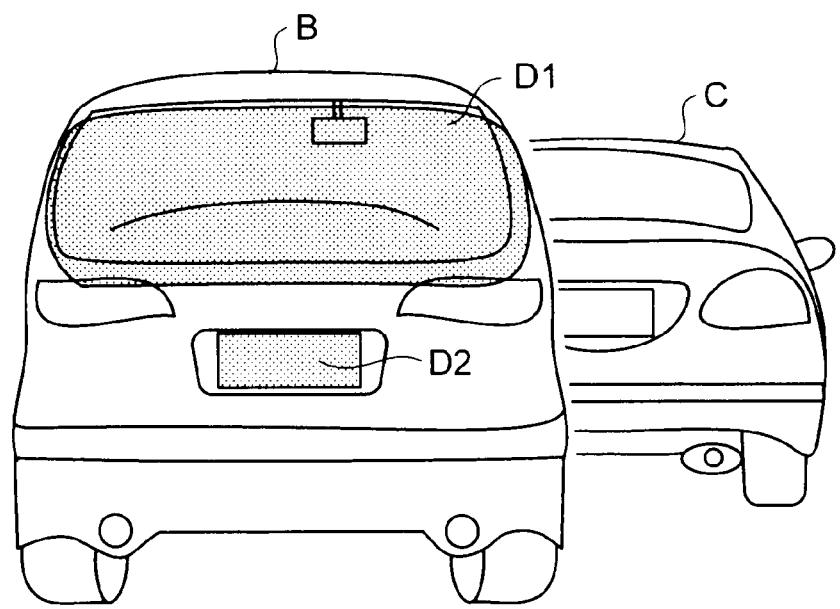
FIG. 4 is a schematic direction of one example that a part of a first front vehicle in the image is masked by a mask image.

Moreover, FIG. 4 shows an example that a back window and a back number plate of the first front vehicle B are masked. As to the first back vehicle B, a front window and a front number plate are masked. Furthermore, mask processing had better be executed to not only the first front vehicle and the first back vehicle but also an image of a vehicle running at the side of the user's vehicle along the same direction.

For example, on a wide road having a lane for a plurality of vehicles to run, another vehicle often runs at the right side or the left side of the user's vehicle in parallel therewith (Hereinafter, another vehicle is called a side vehicle). If an angle of visibility of the front camera 11 and the back camera 12 of the imaging unit 10 is wide such as a fisheye camera, or if the camera is equipped with the right side or the left side of the user's vehicle, the side vehicle can be imaged. Accordingly, the side vehicle is also subjected to the mask processing.

Figure 5A:
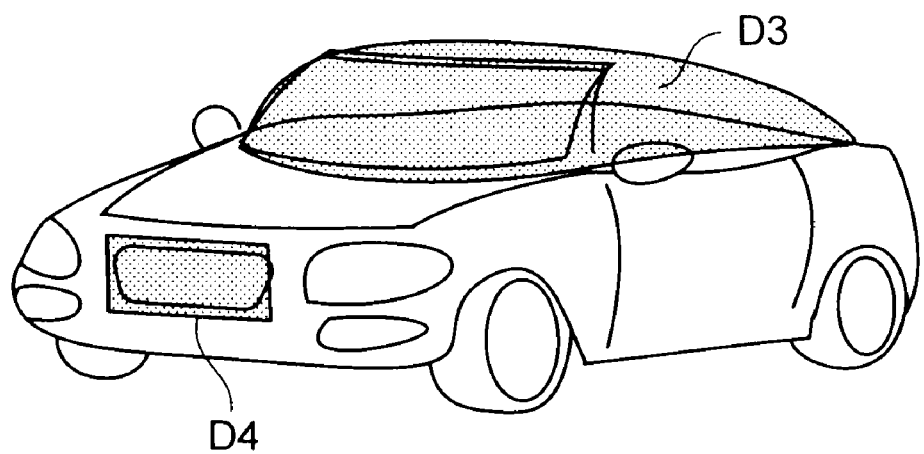
FIGS. 5A and 5B are examples of mask processing of a side vehicle.
Figure 5B:
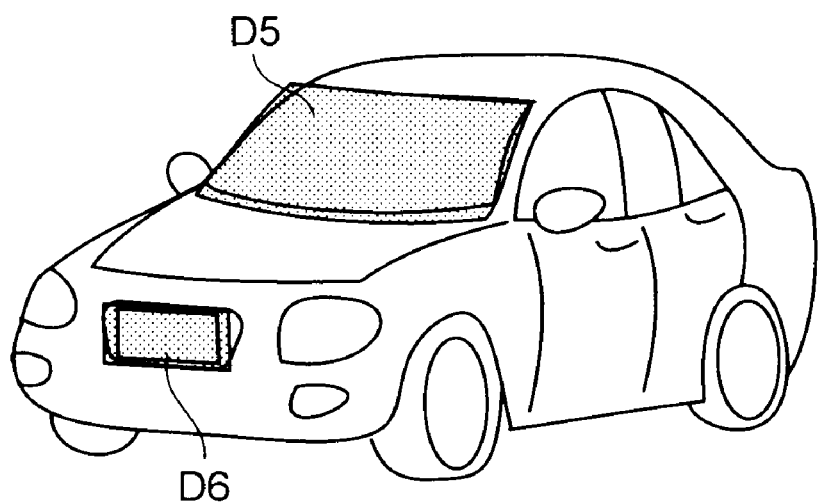

FIGS. 5A and 5B show examples of mask processing of the side vehicle. FIG. 5A shows an example that a part of a vehicle not having the ceiling (such as a sports car) is masked. In this case, a front window and a cabin part of the vehicle are masked by a mask image D3, and a number plate is masked by a mask image D4. As to a vehicle not having the ceiling (such as an open car), all upper part (including the window) of the vehicle may be masked. FIG. 5B shows an example that a part of the side vehicle (such as a sedan type) is masked. In this case, a front window is masked by a mask image D5, and a number plate is masked by a mask image D6.

On the other hand, usually, the second vehicle C can be confirmed via a window of the first vehicle B. However, when the window of the first vehicle B is masked, the second vehicle B is concealed, and the user cannot visually recognize it. Especially, if the second vehicle C is smaller than the first vehicle B, the second vehicle C is concealed by not only the window but also a main body of the first vehicle B. As a result, it is more difficult for the user to visually recognize the second vehicle C.

Accordingly, in the present embodiment, the surroundings-monitoring unit 23 monitors existence of the second vehicle C. When the second vehicle C exists, the identification image generation unit 24 generates an imitation image (illustration E) of the second vehicle C, and the composition processing unit 26 displays the illustration E overlapped with the camera image. The illustration E may be a simple figure or a character figure of personal interest. Moreover, a method for monitoring the second vehicle C by the surroundings-monitoring unit 23 is explained afterwards.

Figure 6A:
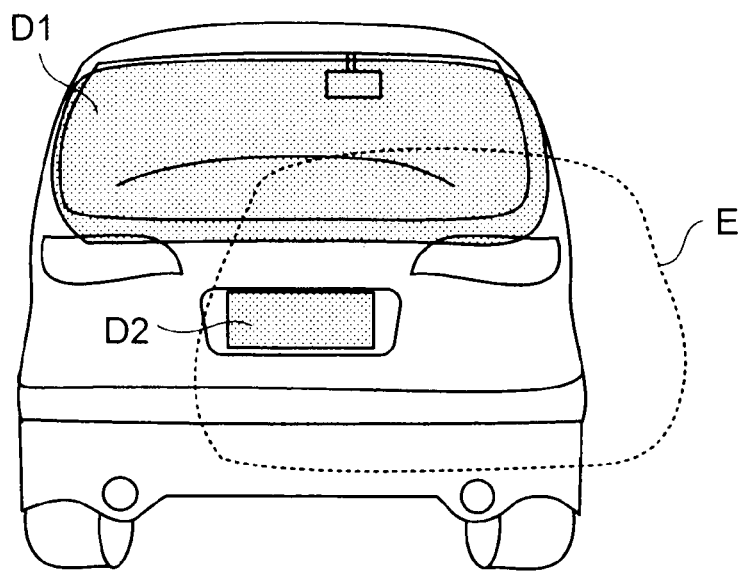
FIGS. 6A and 6B are examples that an image of the first front vehicle is composed with an imitation image of a second front vehicle.
Figure 6B:
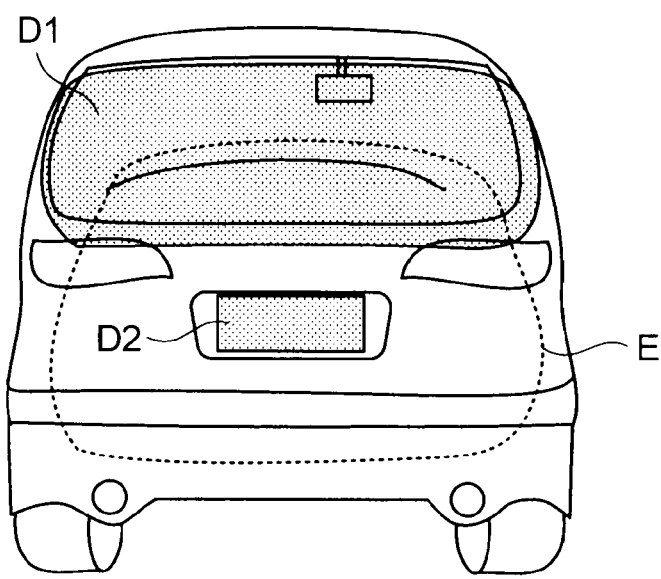

FIGS. 6A and 6B show examples that an image of the first front vehicle B is displayed by overlapping with the illustration E of the second front vehicle C. FIG. 6A shows a combination position of the illustration E in case that a part of the second front vehicle C is concealed by the first front vehicle B as shown in FIG. 3. FIG. 6B shows a combination position of the illustration E in case that the second front vehicle C is almost concealed by the first front vehicle B.

By observing a camera image displayed on the display unit 50, a driver of the user's vehicle can confirm a status of the front side or the back side thereof. In this case, in order to consider personal privacy, a window and a number plate of the first vehicle are masked. As a result, the personal information can be protected. Furthermore, the second vehicle C existing at the front side or back side of the first vehicle B can be confirmed by the illustration E.

Figure 7:
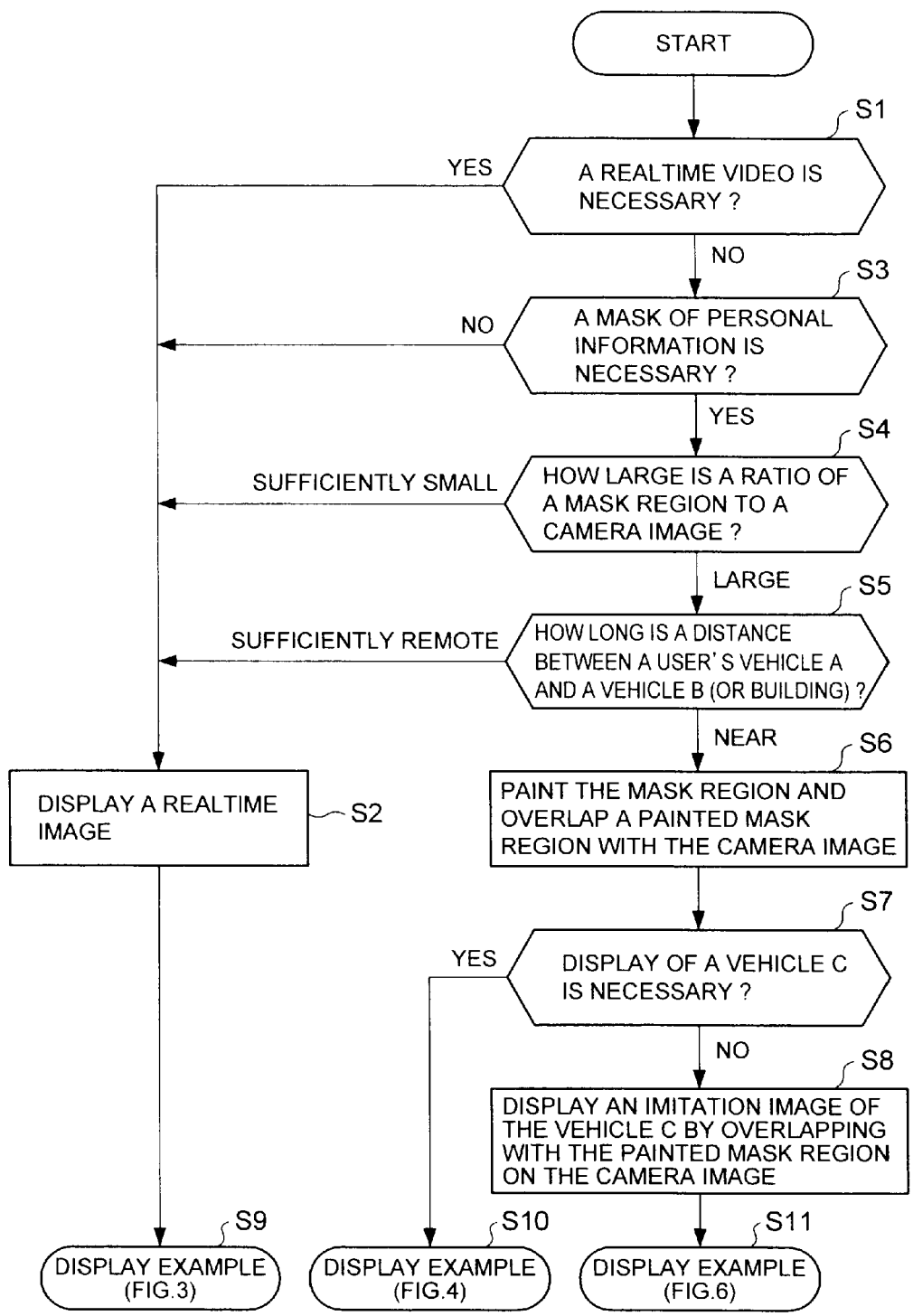
FIG. 7 is a flow chart to explain operation of an image processing unit in FIG. 1.
Figure 8:
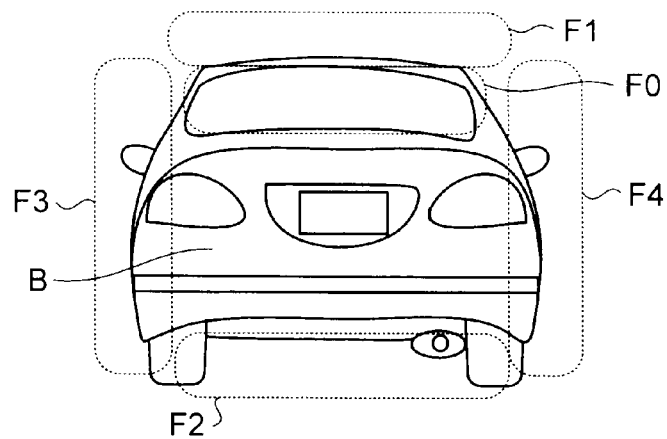
FIG. 8 is a schematic diagram showing detection operation of the second front vehicle by a surroundings-monitoring unit in FIG. 1.

FIG. 7 is a flow chart of operation of the image processing unit 20. The image processing unit 20 operates under control of the control unit 21 by following steps.

In FIG. 7, at S1, it is decided whether a real time image (non-masked image) is necessary. Briefly, by totally deciding images (from the cameras 11 and 12) and information (from the vehicle information generation unit 30), it is decided whether the present time represents an emergency case. In case of the emergency case or an accident, or in case that the driver need avoid the accident, it is decided that real time image is desired, and processing is forwarded to S2. At S2, an actual image (camera image) is displayed without mask processing. As a result, at S9, the real time image is displayed as shown in FIG. 3.

If a decision of S1 is "NO", it is decided whether a mask of personal information is necessary at S3. For example, if a window of the first vehicle B is black, the second vehicle C cannot be seen via the window of the first vehicle B, and the mask processing is not necessary. In this case, processing is forwarded to S2, and the real time image is displayed as shown in FIG. 3.

If it is decided that the mask processing is necessary at S3, a ratio of the mask region to all region of the camera image is decided at S4. Briefly, if a window of an object (the first front vehicle) is small, cabin-information quantity via the window is limited, and it is considered that privacy is not infringed. Accordingly, if the ratio of the mask region to all region of the camera image is smaller than a predetermined threshold, processing is forwarded to S2, and an actual image (camera image) is displayed without the mask processing. Moreover, at S9, the number plate part had better be masked.

If the ratio of the mask region to all region of the camera image is larger than the predetermined threshold at S4, a distance between the user's vehicle A and the first vehicle B, and a distance between the user's vehicle A and a building, are respectively calculated at S5. In view of the camera-performance, if the user's vehicle A is sufficiently remote from the first vehicle B, imaging of the personal information is difficult. Accordingly, processing is forwarded to S2, and a real time image (camera image) is displayed. Moreover, a distance coefficient changes by a resolution of camera and surroundings-status (such as light and darkness, or a fog). Furthermore, if a building exists around the user's vehicle, an image of personal information (such as a window or a doorplate) is possibly included in a camera image of the building. Accordingly, the camera image is subjected to the mask processing in the same way.

If the user's vehicle A is near the first vehicle B at S5, a mask region is painted and overlapped with the camera image at S6. Furthermore, at S7, it is decided whether display of the second vehicle C is necessary. Briefly, by masking a part of the camera image, the second vehicle C located at the front or back of the first vehicle B is concealed and cannot be seen. Accordingly, necessity to display the second vehicle C is decided. If the second vehicle C does not exist or locates remotely from the first vehicle B, at S10, an image to mask a window and a number plate of the first vehicle B is only combined with the camera image, and a composite image is displayed as shown in FIG. 4.

Furthermore, if display of the second vehicle B is necessary, an imitation image (illustration E) of the second vehicle C is combined at S8. At S11, a camera image is combined with mask images D1, D2 and the illustration E, and a composite image is displayed as shown in FIG. 6.

Moreover, if a part of the second front vehicle C is over the first front vehicle B as shown in FIG. 4, an actual image of the part (not concealed) of the second front vehicle C may be displayed as an identification image. Furthermore, all of the second front vehicle C may be displayed as an imitation image (illustration). For example, display-switching of "actual image-illustration" may be performed by the operation unit 40. When the illustration is displayed, flicker phenomenon of the image can be suppressed, and personal information in a cabin of the second front vehicle C can be masked.

Next, a method for generating the imitation image by confirming the second vehicle C is explained in detail. In following explanation, the case to monitor whether the second front vehicle C exists at the front of the first front vehicle B is explained. However, the same method can be applied to the case to monitor whether the second back vehicle C exists at the back of the first back vehicle B.

Decision for existence of the second vehicle C is performed by the surroundings-monitoring unit 23 under a control of the control unit 21. Generation of the imitation image is performed by the identification image generation unit 24. Based on an image from the front camera 11, the surroundings-monitoring unit 23 monitors an irregular approach to the first front vehicle B or a behavior thereof. At the same time, the second front vehicle C (running at the front of the first front vehicle B) is also monitored, and an existence and a disappearance of the second front vehicle C are decided. For example, based on following decision points (1)~(4), a vehicle is identified in the camera image by separating from a background region.

(1) How to recognize the second front vehicle C (running at the front of the first front vehicle B):

(2) Whether an object included in the camera image is recognized as a vehicle:

(3) In a period that the second front vehicle C is concealed by the first front vehicle B and not seen, how to decide a position and a disappearance of the second front vehicle C:

(4) When the second front vehicle C is changed to another vehicle without a user's awareness, how to decide the change:

Hereinafter, decision points (1)~(4) are explained.

(1) First, the surroundings-monitoring unit 23 decides a shape, a size and a body color of the first front vehicle B, and records them. Furthermore, from the shape and the size, the total length (such as a regular car, a small-sized car, or a track) is roughly estimated. As to detection of the second front vehicle C, an object having a color different from the first front vehicle B, or an object having a size over the first front vehicle B, is detected. Furthermore, via a window of the first front vehicle B, or from top and bottom (or side) of the first front vehicle B, the second front vehicle is detected. As detection parts, as shown in FIG. 5, a window F0, an upper part F1, a lower part F2, a left side F3 and a right side F4 of the first front vehicle B, i.e., five parts, are used.

In this case, as to whether the second front vehicle C is recognized via a window of the first front vehicle A, or as to whether at least two parts of the second front vehicle C are recognized over from top and bottom (or right and left) of the first front vehicle B, a recognition result is recorded as a history. This recognition result is called an existence flag of the second vehicle C. Moreover, when the first front vehicle B and the second front vehicle C do not exist, the recognition result is initialized.

Then, based on a total length L1 of the first front vehicle B, a distance L2 between the user's vehicle A and an object running at the front of the first front vehicle B, and a distance L3 ($=\infty$) between the user's vehicle A and a front scene, following condition is checked.

$$L1 < L2 \leq L3 \ (=\infty) \quad (1)$$

If above condition (1) is concluded, an object running at the front of the first front vehicle B is regarded as the second front vehicle C. Furthermore, in this case, by assuming the object as a vehicle, a size of the second front vehicle C is estimated and recorded as a temporary size (This is used for deciding "vehicle-change without awareness" explained afterwards.).

(2) A condition to recognize the second front vehicle C as an object running at the front of the first front vehicle B is following (a) and (b). In this case, the object is called "a temporary vehicle" until the object is formally recognized as a vehicle.

(a) The temporary vehicle is running on the same lane as the user's vehicle and the first front vehicle.

(b) If the lane of the temporary vehicle is different from a lane thereof, the temporary vehicle is running by keeping a predetermined distance from the user's vehicle (or the first front vehicle B) for M seconds.

When the temporary vehicle stops before it is formally recognized as a vehicle, M seconds-count is temporarily interrupted. Alternatively, when the temporary starts running again, M seconds counter is reset and started to count again. Then, in only case that the user's vehicle A is running, the object running by continually keeping the predetermined distance from the user's vehicle A is estimated as a vehicle. Based on a total length L1 of the first front vehicle B, a distance L2 between the user's vehicle A and the object (running at the front of the first front vehicle B), and a distance L4 as a sum of the total length L1 and a predetermined distance K, following condition is checked.

$$L1 < L2 \leq L4 \ (L4 = L1 + K) \quad (2)$$

If above condition (2) is concluded, the object running at the front of the first front vehicle B is regarded as the second front vehicle C.

Figure 9A:
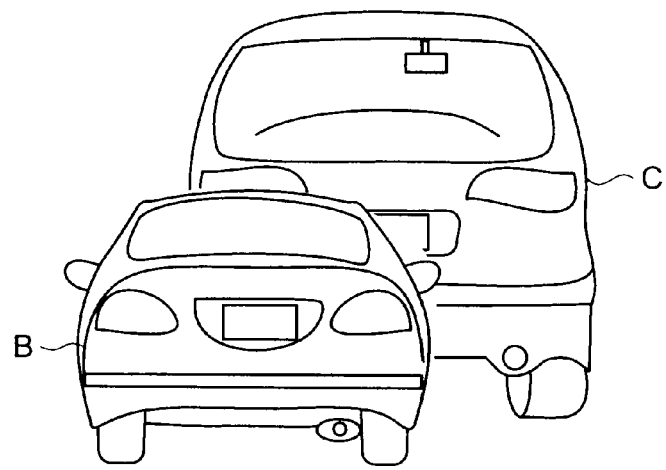
FIGS. 9A and 9B are examples that the first front vehicle and the second front vehicle are arranged.

(3) By the existence flag of the vehicle C, it is decided whether the second front vehicle C is continually running or temporarily viewed by a positional relationship of the first front vehicle B. Briefly, as shown in FIG. 9A, when a large-sized vehicle C exists at the front of the regular vehicle B (moving at the front of the user's vehicle A), the large-sized vehicle C can be continually recognized. Accordingly, if the large-sized vehicle C cannot be viewed from the front of the regular vehicle B for N seconds, it is decided that the large-sized vehicle C has disappeared.

Figure 9B:
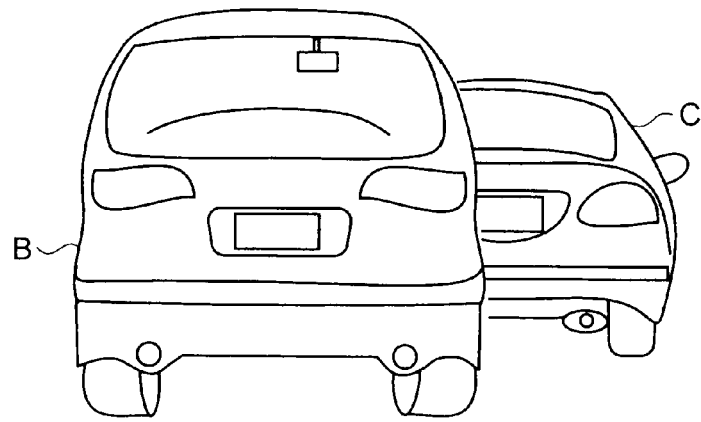

Furthermore, as shown in FIG. 9B, when a large-sized vehicle B exists at the front of the user's vehicle A and when a regular vehicle C exists at the front of the large-sized vehicle B, only one part of the regular vehicle C can be temporarily viewed from the user's vehicle A. Accordingly, even if the regular vehicle C is concealed by the large-sized vehicle C and cannot be continually viewed, it is not decided that the regular vehicle C has disappeared. In this way, a polling to detect an object appeared to be vehicles B and C is performed at a predetermined interval. Even if the second front vehicle C cannot be visually recognized on the image, it is continually decided for N seconds that the second front vehicle C exists.

In this case, a position of the second front vehicle C is decided as following (c)~(e).

(c) The second front vehicle C exists at the front of the first front vehicle B.

(d) The second front vehicle C locates at a center position of a width of the first front vehicle B along a transverse direction. Top and bottom position thereof is a position finally recognized.

(e) A relative distance between the first front vehicle B and the second front vehicle C is maintained as a relative distance thereof finally recognized.

Furthermore, even if a status that the second front vehicle C cannot be visually recognized on the image continues for N seconds, if a history that the second front vehicle C is temporarily recognized is recorded, it is not decided that the second front vehicle C has disappeared. Accordingly, even if the status has continued over N seconds, it is decided that the second vehicle B exists. However, if any vehicle does not exist within a predetermined distance along a front direction of the user's vehicle A, it is decided that not only the first front vehicle B but also the second front vehicle C have disappeared.

(4) When an estimated size or a body color of the second front vehicle C has largely changed, it is decided that the second front vehicle C is replaced with another vehicle. This is called "vehicle-change without awareness", and the existence flag of the vehicle C is cleared. If the flag/information of a previous vehicle is already recorded with "vehicle-change without awareness", this information is cleared to abandon at decision timing of "vehicle-change without awareness".

In this way, when it is decided that the second front vehicle C exists at the front of the first front vehicle B, an imitation image (illustration E) of the second front vehicle C is generated. As shown in FIGS. 6A and 6B, the illustration E is combined with a camera image, and this composite image is displayed. A position of the illustration E changes based on a position of the second front vehicle C. Furthermore, when the second front vehicle C is changed to another vehicle without awareness, a color and a size of illustration is changed based on another vehicle and the previous illustration E is deleted.

Figure 10:
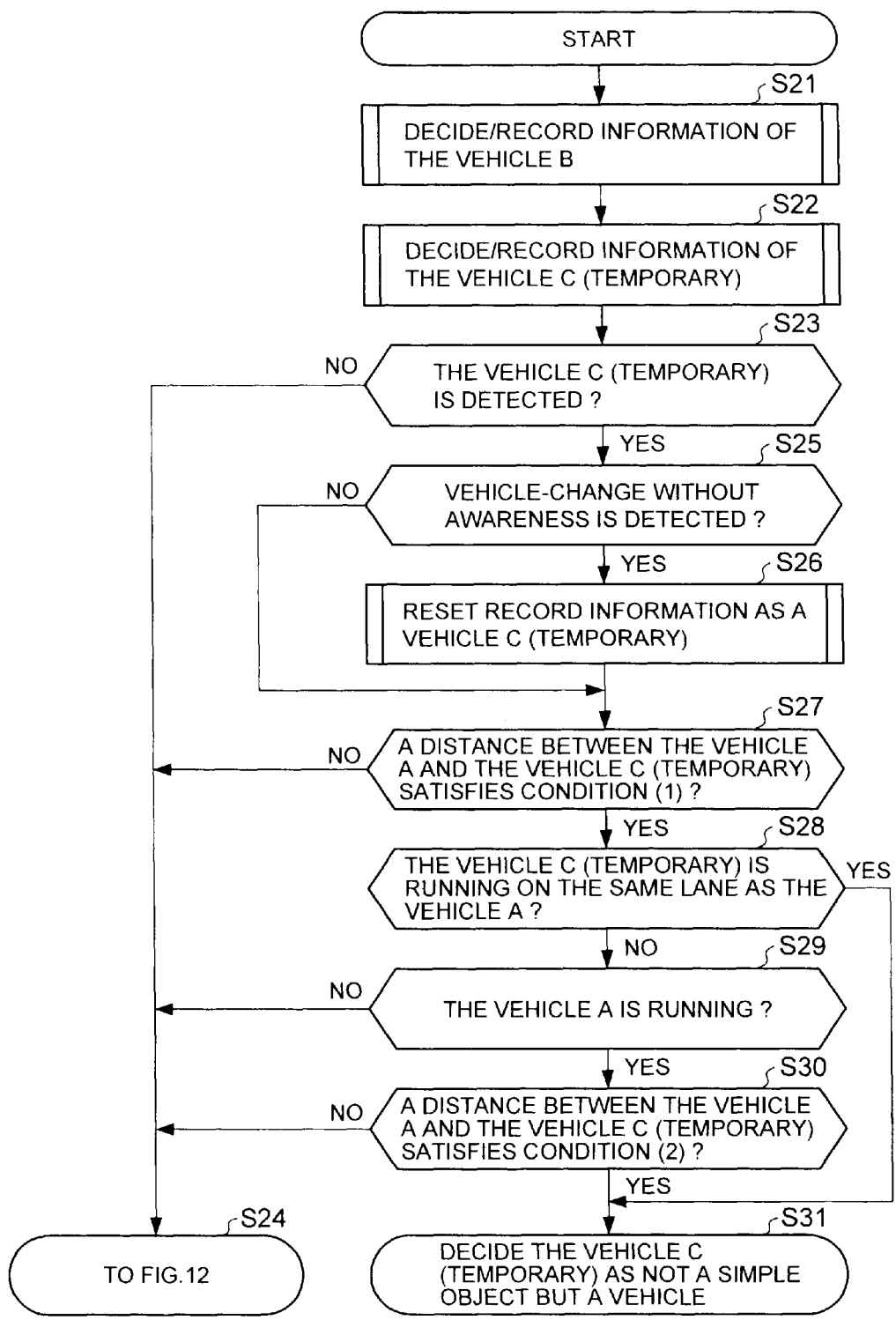
FIG. 10 is a flow chart of processing to recognize an object running at the front of the first front vehicle as the second front vehicle.

FIG. 10 is a flow chart of processing that an object running at the front of the first front vehicle B is recognized as the second front vehicle C. In following explanation, the first front vehicle B is often called a vehicle B, and the second front vehicle C is often called a vehicle C.

In FIG. 10, at S21, information of the vehicle B is decided and recorded. Briefly, if the vehicle B is visually recognized, a shape, a size, and a distance between the vehicle B and a user's vehicle A, are estimated and recorded. Furthermore, a bode color of the vehicle B is recorded.

Figure 12:
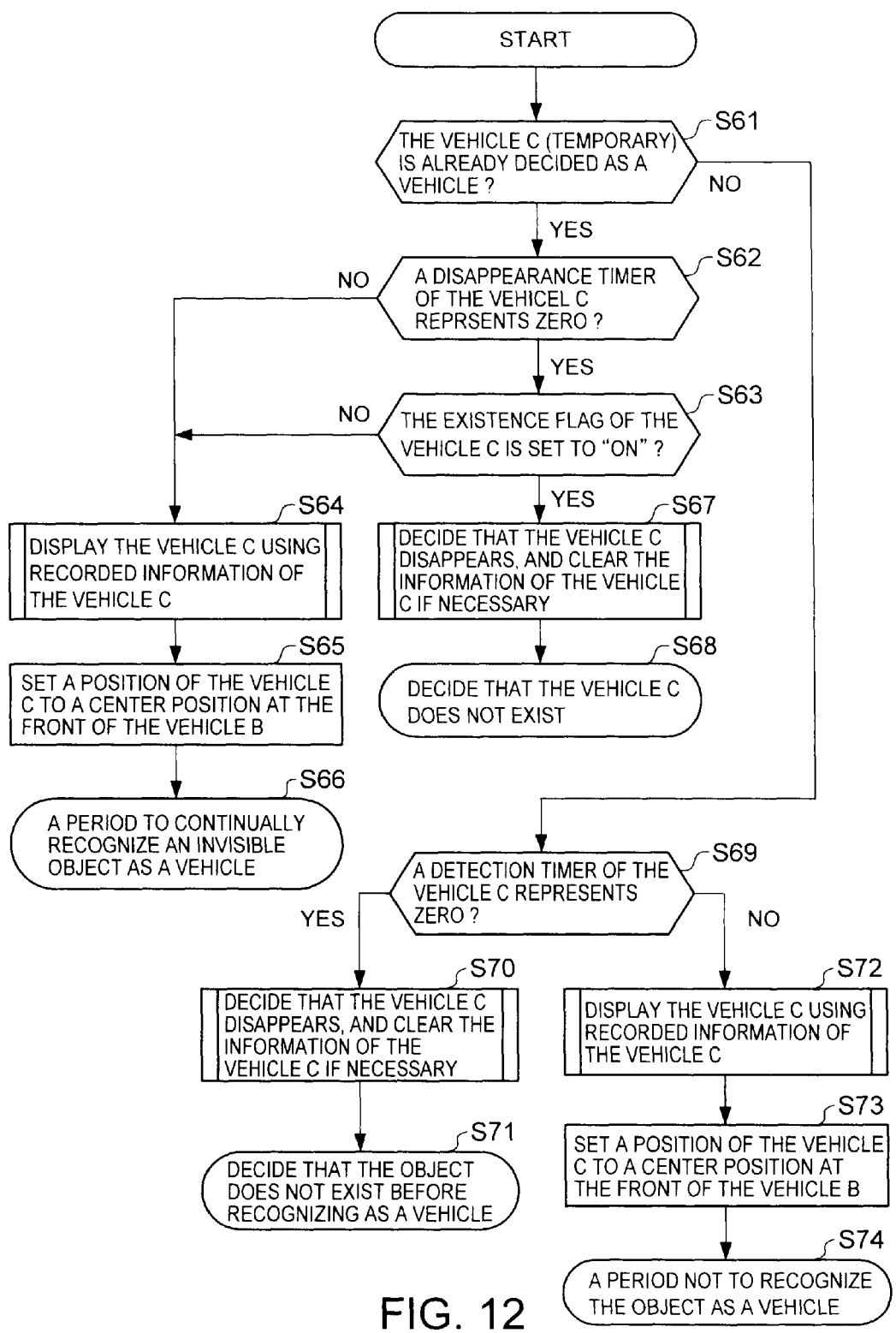
FIG. 12 is a flow chart of processing in case that the second front vehicle is not detected.

At S22, information of the vehicle C (temporary) is decided and recorded. In this case, a shape and a size of an object appeared to be the vehicle C, and a distance between the object and the user's vehicle A, are estimated and recorded. Furthermore, an existence flag of the vehicle C, and a detection timer of the vehicle C (temporary), are set. At S23, it is decided whether the vehicle C (temporary) is detected. If the vehicle C (temporary) is not detected, processing is forwarded to S24. In this case, as shown in FIG. 12, a flow chart of the case that the vehicle C (temporary) and/or the vehicle C are not detected is executed (explained afterwards).

If the vehicle C (temporary) is detected at S23, a vehicle-change without awareness is decided at S25. If the vehicle-change without awareness is detected, record information of the vehicle C (temporary) is reset at S26. After resetting, or if the vehicle-change without awareness is not detected at S25, it is decided whether a distance L2 between the vehicle C (temporary) and the user's vehicle satisfies above-mentioned condition (1) at S27. If the distance L2 does not satisfy the condition (1), processing is forwarded to S24. If the distance L2 satisfies the condition (1), it is decided whether the vehicle C (temporary) is on the same lane as the user's vehicle A at S28.

If the vehicle C (temporary) is not on the same lane as the user's vehicle A at S28, processing is forwarded to S24. If the vehicle C (temporary) is on the same lane as the user's vehicle A at S28, it is decided whether the user's vehicle A is running at S29. If the user's vehicle A is not running at S29, processing is forwarded to S24. If the user's vehicle A is running at S29, it is decided whether a distance L2 between the vehicle C (temporary) and the user's vehicle A satisfies above-mentioned condition (2) at S30. If the distance L2 does not satisfy the condition (2), processing is forwarded to S24. If the distance L2 satisfies the condition (2), it is decided that the vehicle C (temporary) is not a simple object but a vehicle at S31. In this case, the existence flag of the vehicle C is set to "ON", and a disappearance timer of the vehicle C is set. Moreover, the disappearance timer of the vehicle C is reset whenever the vehicle C is detected.

Figure 11:
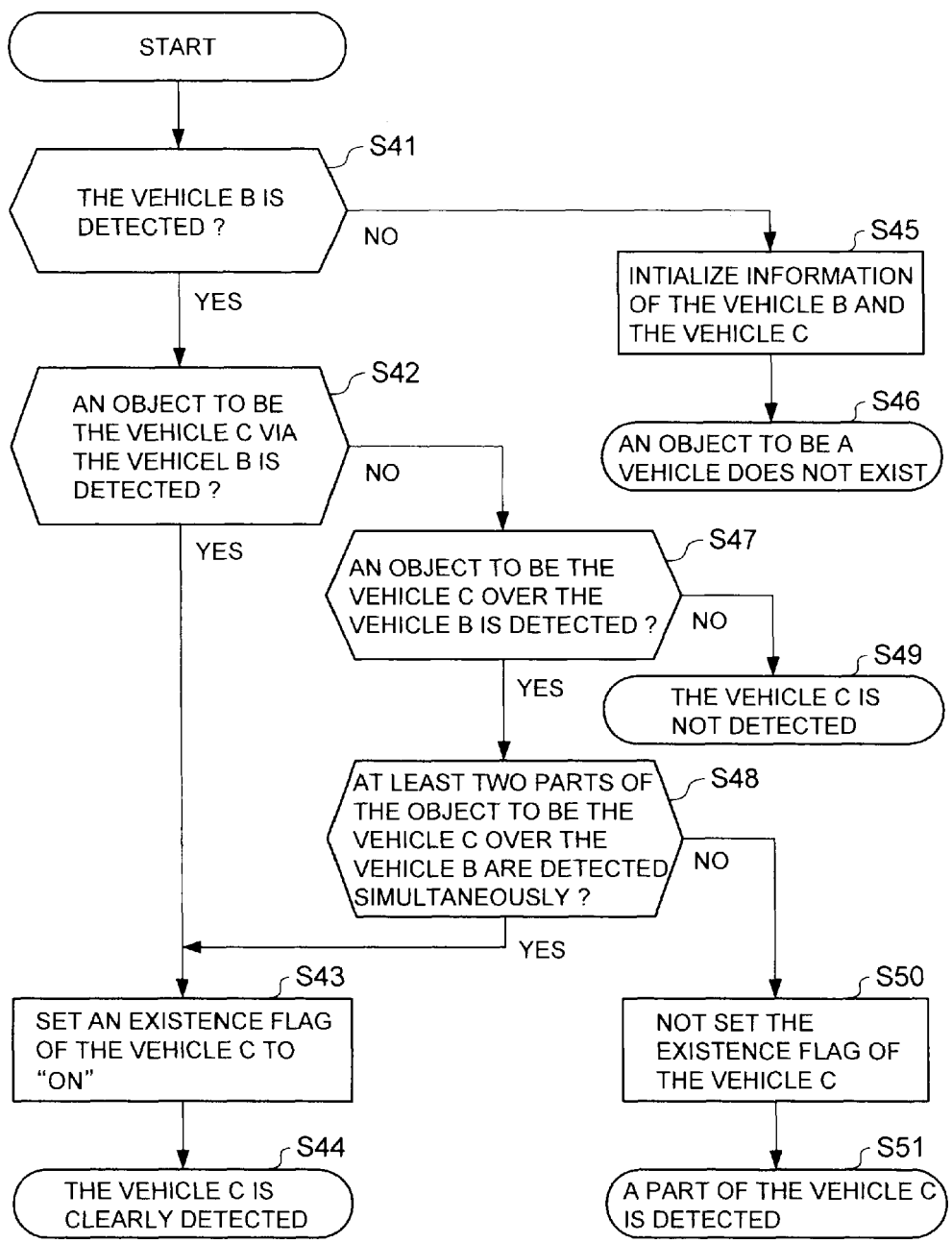
FIG. 11 is a flow chart of processing to detect the second front vehicle from the image.

FIG. 11 is a flow chart of algorithm to detect the vehicle C from the camera image. In FIG. 11, at S41, it is decided whether the vehicle B is detected. If the vehicle B is detected, at S42, it is decided whether an object appeared to be the vehicle C (at the front of the vehicle B) is detected via a window of the vehicle B. If the object is detected, processing is forwarded to S43. In this case, the existence flag of the vehicle C is set to "ON". At S44, it is decided that the object appeared to be the vehicle C is clearly detected, and the identification image generation unit 24 generates an illustration of the vehicle C. For example, the illustration E is displayed as shown in FIG. 6A.

Furthermore, if the vehicle B is not detected at S41, information of the vehicle B and the vehicle C is initialized. In this case, at S46, it is decided that an object appeared to be a vehicle does not exist at the front of the user's vehicle A. Furthermore, if an object appeared to be the vehicle C is not detected via a window of the vehicle B at S42, it is decided whether an object (appeared to be the vehicle C) over the vehicle B is detected on the image at S47. If the object is detected, at S48, it is decided whether at least two parts of the object (over the vehicle B) are simultaneously detected. If the at least two parts of the object are simultaneously detected (such as the case of FIG. 9A), processing is forwarded to S43, and the existence flag of the vehicle C is set to "ON".

If the at least two parts of the object are not simultaneously detected (such as the case of FIG. 9B, i.e., the second front vehicle C is concealed) at S48, processing is forwarded to S50, and the existence flag of the vehicle C is not set. In this situation, the object appeared to be the vehicle C is not clearly recognized. Accordingly, at S51, it is decided that a part of the object appeared to be the vehicle C is detected. In this case, the illustration E of the vehicle C is displayed as shown in FIG. 6B.

FIG. 12 is a flow chart of processing in case that the vehicle C and the vehicle C (temporary) are not detected. In FIG. 12, at S61, it is decided whether the vehicle C (temporary) is already decided as a vehicle. If the vehicle C (temporary) is already decided as a vehicle, at S62, it is decided whether a disappearance timer of the vehicle C represents zero. If the disappearance timer represents zero, at S63, it is decided whether the existence flag of the vehicle C is "ON".

If the disappearance flag does not represent zero at S62, or if the existence flag is not "ON" at S63, processing is forwarded to S64. In this case, it is decided that the vehicle C cannot be viewed but continually exists, and an illustration is displayed based on recorded information of the vehicle C. At S65, a position of the vehicle C is set to a center position at the front of the vehicle B. As a relative position between the vehicle C and the user's vehicle A, recorded information is used. At S66, this time corresponds to a period to continually recognize an invisible object as a vehicle.

If the existence flag is "ON" at S63, under a status able to visually recognize the object, the vehicle C cannot be viewed in a predetermined time. In this case, it is decided that the vehicle C has disappeared, and information of the vehicle C is cleared if necessary. At S68, it is decided that the vehicle C does not exist.

Furthermore, if the vehicle C (temporary) is not decided as the vehicle yet, it is decided whether a detection timer of the vehicle C (temporary) represents zero at S69. If the detection timer represents zero, processing is forwarded to S70. In this case, it is decided that the vehicle C has disappeared, and information of the vehicle C is cleared if necessary. At S71, it is decided that an object has disappeared (does not exist) before recognizing the object as a vehicle. Furthermore, if the detection timer does not represent zero at S69, processing is forwarded to S72. In this case, it is decided that the vehicle C cannot be viewed but continually exists, and an illustration is displayed based on recorded information of the vehicle C (temporary). At S73, a position of the vehicle C is set to a center position at the front of the vehicle B. At S74, this time corresponds to a period unable to recognize the object as a vehicle.

As mentioned-above, in the present embodiment, by imaging a surroundings-status at the front side and back side of the user's vehicle, an operation of the driver (user) is supplemented. Especially, by masking a window (or a number plate) of the first vehicle and the second vehicle on a camera image, personal information can be protected. Furthermore, when the second front vehicle and the second back vehicle are concealed by masking, an imitation image thereof is displayed for the driver to visually recognize them. Furthermore, if the camera-performance improves, by masking a part of personal information on the camera image, it is avoided that this behavior is regarded as an imaging on condition that an object is unconscious of the imaging.

In the present embodiment, various modifications can be applied. For example, as to the camera, except for imaging at the front side and the back side of the user's vehicle, the side direction (transverse direction of the user's vehicle running) may be imaged.

While certain embodiments have been described, these embodiments have been presented by way of examples only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An apparatus for displaying an image for a vehicle, comprising:
   an imaging unit configured to input a camera image of surroundings of the vehicle, the surroundings including at least one of a front side and a back side of the vehicle along a running direction;
   a first image generation unit configured to generate a mask image to conceal a protection region of personal information included in a region of a first vehicle on the camera image, the first vehicle existing at the front side or the back side of the vehicle;
   a surroundings-monitoring unit configured to decide whether a second vehicle exists at a front side or a back side of the first vehicle by monitoring the camera image, the second vehicle being running at the front side of the first vehicle before the vehicle or at the back side of the first vehicle rear of the vehicle;
   a second image generation unit configured to generate an imitation image of the second vehicle which does not include the same type of mask image of the first vehicle when the surroundings-monitoring unit decides that the second vehicle exists; and
   a processing unit configured to generate a composite image by combining the mask image and the imitation image with the camera image so that the imitation image is completely visible even when at least a portion of the second vehicle is hidden from view by the first vehicle, and to present the composite image to a user of the vehicle via a display.

2. The apparatus according to claim 1,
   wherein the processing unit, at an emergency time, outputs the camera image from the imaging unit in real time via the display, not by combining the mask image.

3. The apparatus according to claim 1,
   wherein the first image generation unit extracts a window and a number plate of the first vehicle as the protection region from the region of the first vehicle, and generates the mask image corresponding to the protection region.

4. The apparatus according to claim 1,
   wherein the first image generation unit decides whether to generate the mask image, based on at least one of a color and a size of a window of the first vehicle, and a distance between the vehicle and the first vehicle.

5. The apparatus according to claim 1,
   wherein the surroundings-monitoring unit monitors at least one of a window, an upper part, a lower part and a side of the first vehicle on the camera image, and recognizes an object having a color different from the first vehicle or an object having a size over the first vehicle on the camera image, as the second vehicle.

* * * * *